United States Patent
Kraft

(10) Patent No.: US 7,383,289 B2
(45) Date of Patent: Jun. 3, 2008

(54) UPDATING AND MAINTAINING DATA IN A MULTI-SYSTEM NETWORK USING ASYNCHRONOUS MESSAGE TRANSFER

(75) Inventor: Frank Michael Kraft, Speyer (DE)

(73) Assignee: SAP Aktiengesellschaft (DE)

( * ) Notice: Subject to any disclaimer, the term of this patent is extended or adjusted under 35 U.S.C. 154(b) by 496 days.

(21) Appl. No.: 10/726,295

(22) Filed: Dec. 2, 2003

(65) Prior Publication Data

US 2005/0120061 A1 Jun. 2, 2005

(51) Int. Cl.
*G06F 17/30* (2006.01)

(52) U.S. Cl. ......................................... 707/200; 707/10

(58) Field of Classification Search .................... 707/8, 707/104.1, 200–203, 10, 103 R–103 Z
See application file for complete search history.

(56) References Cited

U.S. PATENT DOCUMENTS

| | | | |
|---|---|---|---|
| 4,694,422 A | 9/1987 | Kakuda et al. ............... 714/49 |
| 4,777,595 A | 10/1988 | Strecker et al. ............. 709/236 |
| 5,551,046 A * | 8/1996 | Mohan et al. .................. 707/8 |
| 5,655,075 A | 8/1997 | Saito et al. ................... 714/48 |
| 5,812,793 A | 9/1998 | Shakib et al. ............... 709/201 |
| 5,842,216 A | 11/1998 | Anderson et al. ........... 707/203 |
| 5,864,837 A | 1/1999 | Maimone et al. .............. 707/1 |
| 5,899,998 A | 5/1999 | McGauley et al. ...... 707/104.1 |
| 5,946,689 A | 8/1999 | Yanaka et al. ................ 707/10 |
| 5,970,488 A | 10/1999 | Crowe et al. .................. 707/8 |
| 5,974,129 A | 10/1999 | Bodnar .................. 379/220.01 |
| 6,041,333 A | 3/2000 | Bretschneider et al. ..... 707/203 |

(Continued)

FOREIGN PATENT DOCUMENTS

EP 0 684 720 A 11/1995

(Continued)

OTHER PUBLICATIONS

Helmuth Trefftz and Ivan Marsic, "Distributed Virtual Environment: Message Caching for local and global resource optimization in shared virtual environments", Proceedings of the ACM Symposium on Virtual Reality Software Technology VRST'00, Oct. 2000, pp. 97-102.*

(Continued)

*Primary Examiner*—Cheryl Lewis
(74) *Attorney, Agent, or Firm*—Fish & Richardson P.C.

(57) ABSTRACT

Techniques are provided for updating a local cache database of an application system in a multi-system environment having a central system that maintains central data objects that are shared by the multiple systems. A first application system executes an application and processes a document using a data object having a version identifier. A message is sent to a second application system including the data object used to process the document and a corresponding version identifier for the data object. The second application system receives the message, and the version identifier in the message is compared to a version identifier of a corresponding data object stored in the second application system. If the version identifier of the data object stored in the second application system indicates that a more recent version of the data object exists, the more recent version of the data object is requested from a central system that maintains the data objects and the second system is updated.

20 Claims, 4 Drawing Sheets

U.S. PATENT DOCUMENTS

| | | | |
|---|---|---|---|
| 6,205,481 B1 * | 3/2001 | Heddaya et al. | 709/226 |
| 6,212,653 B1 | 4/2001 | Boivin et al. | 714/45 |
| 6,393,526 B1 * | 5/2002 | Crow et al. | 711/137 |
| 6,405,219 B2 | 6/2002 | Saether et al. | 707/201 |
| 6,415,315 B1 | 7/2002 | Glass | 709/201 |
| 6,442,586 B1 | 8/2002 | Glass | 709/202 |
| 6,442,651 B2 * | 8/2002 | Crow et al. | 711/118 |
| 6,529,932 B1 | 3/2003 | Dadiomov et al. | 718/101 |
| 6,564,218 B1 | 5/2003 | Roth | 707/10 |
| 6,578,056 B1 | 6/2003 | Lambert | 715/205 |
| 6,631,386 B1 | 10/2003 | Arun et al. | 707/203 |
| 6,738,797 B1 | 5/2004 | Martin | 709/201 |
| 6,754,657 B2 | 6/2004 | Lomet | 707/8 |
| 6,761,636 B2 | 7/2004 | Chung et al. | 463/42 |
| 6,952,660 B1 | 10/2005 | Matheson | 703/1 |
| 2001/0000083 A1 * | 3/2001 | Crow et al. | 711/130 |
| 2001/0037395 A1 * | 11/2001 | Sabat et al. | 709/229 |
| 2002/0059299 A1 | 5/2002 | Spaey | 707/104.1 |
| 2004/0153473 A1 | 8/2004 | Hutchinson et al. | 707/104.1 |

FOREIGN PATENT DOCUMENTS

| | | |
|---|---|---|
| EP | 0 926 608 A | 6/1999 |

OTHER PUBLICATIONS

"Analysis of Petri Net Performance Model," http://www.document.ic.ac.uk/~nd/surprise_95/journal/vol2/nrl/article2.html, printed from the Internet Sep. 5, 2003, 2 pgs.

"Application Link Enabling," http://searchsap.techtarget.com/sDefinition/0,,sid21_gci822148,00.html, May 7, 2002, printed from the Internet Dec. 10, 2003, 2 pgs.

Brink, Richard Scott, "A Petri Net Design, Simulation, and Verification Tool," Rochester Institute of Technology, Sep. 1996, http://www.csh.rit.edu/~rick/thesis/document/PetriThesis.html, printed from the Internet Sep. 5, 2003, 47 pgs.

Carryer, J. Edward, "State Machines," Feb. 2, 2001, http://design.stanford.edu/spdl/ee118/pdf_files/StateMachines.pdf, printed from the Internet Sep. 5, 2003, 3 pgs.

"DotnetCoders—UML: Statechart Diagrams," copyright 2000-2003 .netCoders, http://www.dotnetcoders.com/web/learning/uml/diagrams/statechart.aspx, printed from the Internet Dec. 10, 2003, 2 pgs.

"Finite State Machine—A WhatIs Definition" http://whatis.techtarget.com/definition/0,,sid9_gci213052,00.html, printed from the Internet Dec. 10, 2003, 4 pgs.

'Half.com: Apple iPod Mini—Questions & Answers' [online]. half.com by ebay, undated materials, [retrieved on Mar. 7, 2005]. Retrieved from the Internet: <URL: http://half.ebay.com/cat/buy/ask_question.cgi?offer_id=1286774759&meta_id=6&domain_id=447>.

'Half.com: Apple iPod Mini—Seller's Description' [online]. half.com by ebay, undated materials, [retrieved on Mar. 16, 2005]. Retrieved from the Internet: <URL: http://half.ebay.com/cat/buy/inv.cgi?offer_id=1286774759&meta_id=6&cpid=1202509734&domain_id=447>.

'The Next Evolution of E-Commerce—Tango Trade Press Release' [online]. Undated materials, [retrieved initially, in part, on Mar 7, 2005, then again in its entirety on Apr. 28, 2005]. Retrieved from the Internet: <URL: http://www.p2p-zone.com/underground/showthread.php?s=threadid=16211>. See, e.g., pp. 10-11.

'P2P Real Time Trading Community from Tango' [online]. Undated materials, [retrieved initially, in part, on Mar. 7, 2005; then again in its entirety on Apr. 28, 2005]. Retrieved from the Internet: <URL: http://www.collaborate.com/publication/newsletter/n10603.html#portal>. See, e.g., pp. 24-25.

Robinson, Scott, "Save Time and Effort with SAP's ALE Change Pointers," http://techrepublic.com.com/5102-6329-1048973.html, Aug. 12, 2002, copyright 1995-2003 CNET Networks, Inc., printed from the Internet Sep. 4, 2003, 3 pgs.

"StateMachines," copyright 1996-2002 BoldSoft, copyright 2002 Borland, http://information.borland.com/techpubs/delphi/boldfordelphi/html/Mech_StateMachines.htm, printed from the Internet Sep. 5, 2003, 1 pg.

'TangoTrade.net—About' [online]. Tango, undated materials, [retrieved on Mar. 16, 2005]. Retrieved from the Internet: <URL: http://www.tangotrade.net/about.html>.

'Tango Trade 2.0: End-User Market for: EBAY P/N 370-2304' [online]. Tango, undated materials, [retrieved on Mar. 7, 2005]. Retrieved from the Internet: <URL: http://rook.tangotrade.net/live/bidask.php?Item=370-2304&ManuName=EBAY>.

'Tango Trade 2.0: Sell an Item' [online]. Tango, undated materials, [retrieved on Mar. 7, 2005]. Retrieved from the Internet: <URL: http://dns-1.wtic.net/sell.php?&PHPAUCTION_SESSION=9182eb870619298ff76e18a31b0a7635>.

"UML Tutorial—State Diagrams," Kennesaw State University, http://pigseye.kennesaw.edu/~dbraun/csis/4650/A&D/UML_tutorial/state.htm, printed from the Internet Dec. 10, 2003, 4 pgs.

'Welcome to TangoTrade.net' [online]. Tango, undated materials, [retrieved on Mar. 7, 2005]. Retrived from the Internet: <URL: http://www.tangotrade.net/index.html>.

Haase, Kim, "Java Message Service API Tutorial," Sun Developer Network Site, Aug. 2001, retrieved from the Internet on Jan. 7, 2004, at http://java.sun.com/products/jms/docs.htm, XP002266306, 270 pgs.

Johnson, David B, et al., "Sender-Based Message Logging," 7th Symposium on Fault-Tolerant Computing, 1987, retrieved from the Internet on Jan. 8, 2004, at http://citeseer.nj.necessary.com/johnson87senderbased.html, XP002266307, 6 pgs.

Kakuda, Yoshiaki, et al., "Automated Verification of Responsive Protocols Modeled by Extended Finite State Machines," Real-Time Systems, Kluwer Academic Publishers, Dordrecht, NL, vol. 7, No. 3, Nov. 1, 1994, XP 000485229, pp. 275-289.

Yuang, Maria C., "Survey of Protocol Verification Techniques Based on Finite State Machine Models," Apr. 11, 1988, Proceedings of the IEEE NBS Computer Networking Symposium, Washington, DC, XP010011847, pp. 164-172.

* cited by examiner

UPDATING AND MAINTAINING DATA IN A MULTI-SYSTEM NETWORK USING ASYNCHRONOUS MESSAGE TRANSFER

TECHNICAL FIELD

This invention relates to asynchronous data transfer between different computing systems, and more particularly to techniques for updating and maintaining the integrity of data in a multiple-system environment where asynchronous messaging is employed.

BACKGROUND

A multiple-system network architecture may include a central system that contains a central database of data objects that are used by other computing systems in the network. The use of the central data objects by the other systems in the network may be accomplished by storing a local copy of the central data objects in each system's local cache database. The local cache database of each system may be updated whenever a change is made to the central data objects in the central system via asynchronous messages that are sent from the central system to the other systems in the network.

The various systems in the network run applications and may create, for example, business documents that are exchanged between the systems for processing. A first system may generate and process a document using the version of the central data objects stored in its local cache database and send that document to a second system in the network for further processing. When the document arrives at the second system, further processing may be performed using the version of the central data objects that exists at the time in the second system's local cache database, and that existing information may be merged with the existing data in the document. Because asynchronous messaging may be used to update the local cache databases of the first and second systems, these systems may have different versions of the central data objects stored in their respective local cache databases at any given point in time. Thus, there is a potential for conflicts between the information merged into the document by the first and second systems during the processing of the document.

SUMMARY

Generally, the invention provides techniques for updating a local cache database of an application system in a multiple-system environment having a central system that maintains central data objects that are shared by the multiple systems. In one aspect, the invention provides a method for performing such an update. In the method, a message identifying a data object having a version identifier assigned by the central system is received by a second application system from a first application system. The version identifier of the data object in the message is compared to a version identifier of a corresponding data object stored in the local cache of the second application system. If the version identifier of the data object stored in the local cache of the second application system indicates that a more recent version of the data object exists, a more recent copy of the data object is requested from the central system, and the local cache of the second application system is updated with the more recent copy of the data object in the central system.

In another aspect, the invention features a method of updating a local cache of an application system in a multiple-system environment having a central system that maintains central data objects that are shared by the multiple systems. The method includes executing an application in a first application system and processing a document using a data object having a version identifier assigned by the central system. A message is sent to a second application system containing a data object identifier to identify the data object used to process the document and the version identifier that corresponds to the data object.

Embodiments of these methods may include one or more of the following features. The version identifier may be a timestamp that indicates the time of the modification of the data object. Alternatively, the version identifier may be a version number that is incremented after each modification of the data object. In some implementations, the message from the first application system may contain the data object having a version identifier assigned by the central system. The message may also identify a document that was processed using the data object.

In alternative implementations, the local cache database of the second application system may be updated with the most recent copy of the data objects by receiving an asynchronous message from the central system containing a most recent copy of the data objects. The central data objects may be shared by the multiple systems by storing a copy of the central data objects in a local cache of each system. The central system may update the local cache of each system by sending an asynchronous message to each system containing the most recent copy of the central data objects.

In other aspects, the invention provides computer program products that perform the above-described methods and techniques. In particular, the computer program products comprise executable instructions embodied on either a computer readable medium or a propagated signal.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
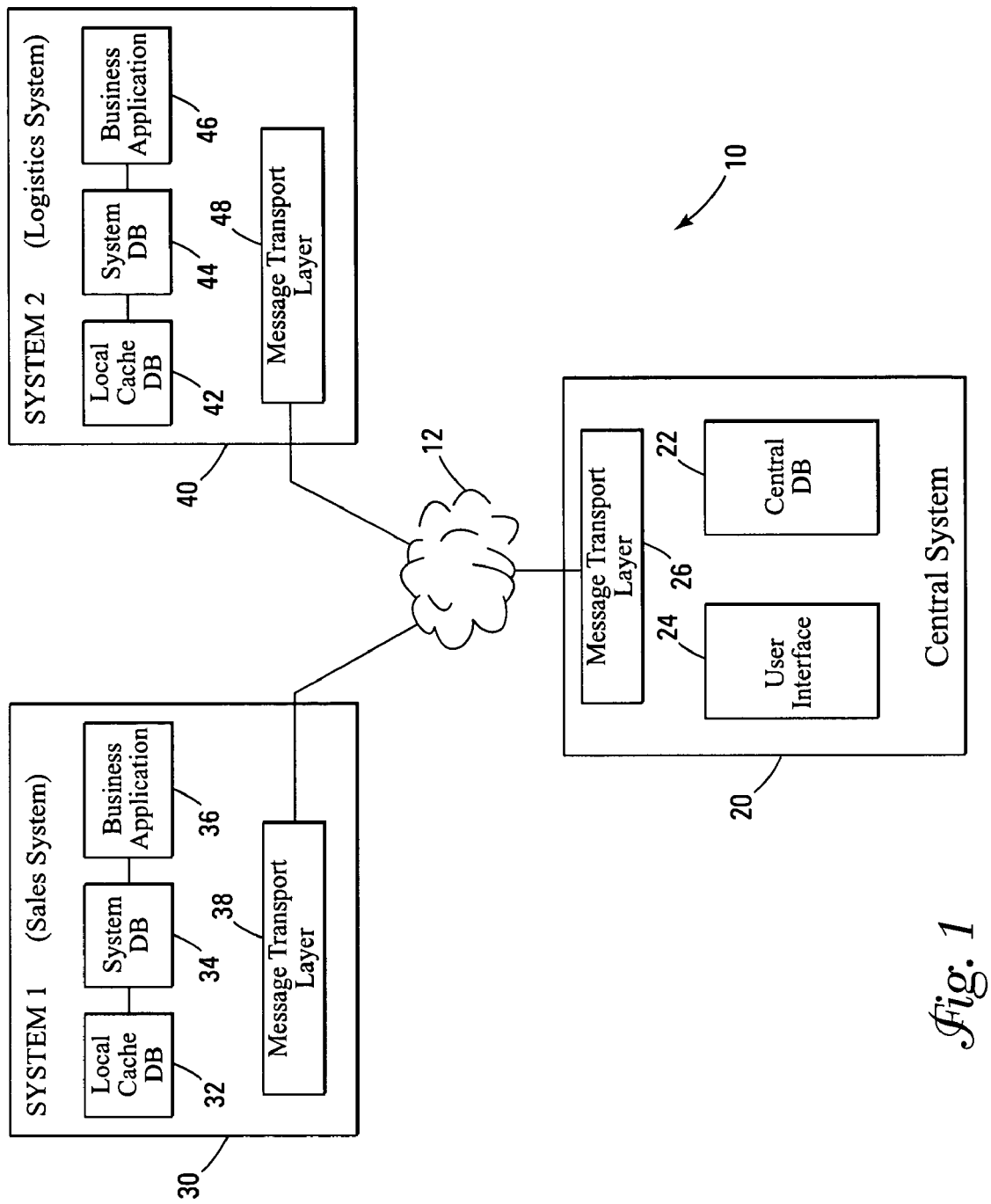
FIG. 1 is a block diagram of a multiple-system network in which business documents are created for processing by multiple systems.

A multiple-system network 10, shown in the FIG. 1 example, includes three networked computing systems, which in this example are a central system 20, a sales system 30, and a logistics system 40. The central system 20 maintains a database 22 of data objects that are utilized by the other systems 30 and 40 in the network. Each data object maintained by the central system 20 includes a corresponding version identifier. The version identifier tracks the modifications or changes that are made to each data object. The sales system 30 and the logistics system 40 each store a copy of the central data objects and the corresponding version number in a local cache database 32 and 42, respectively. For each change made to the data objects in the central system 20, the central system 20 updates the copies of the data objects stored locally by the sales system 30 and logistics system 40 by sending both systems an asynchronous message containing the update. Because asynchronous messaging is used to update the local databases, at any given point in time, the sales system 30 and logistics system 40 may contain different versions of the data objects.

The sales system 30 and the logistics system 40 each may execute, for example, business applications and generate business documents, such as customer orders, delivery orders, invoices, etc., that are exchanged between the systems 30 and 40 for processing. In other implementations, other types of business documents or files may be created by the application systems. In the example of a customer order, the customer order may be generated and processed by the sales system 30 and sent to the logistics system 40 as part of an asynchronous message for further processing. To generate this customer order, the sales system 30 may use its local copy of the central data objects. Because the version of the data objects stored locally by the sales system 30 and the logistics system 40 may differ, the data objects and corresponding version numbers used by the sales system 30 to generate the sales order are identified in the message transmitting the customer order to the logistics system 40. The logistics system 40 then uses this information to determine whether its local cache database 42 has the most recent version of the central data objects, and if not, may request an update of the data objects before processing the customer order. By including the version numbers of the sales system's data objects in the message to the logistics system 40, conflicts between the processing results of the two systems can be avoided and the integrity of the data in the local databases can be maintained.

The central system 20 includes a central database 22, a user interface 24, and a message transport layer 26. The central database 22 may contain one or more data objects that are used by the various systems in the network. In the FIG. 1 example, the data objects relate to products or inventory items that are integral to the business documents that may be generated by the sales and logistics systems 30 and 40. The data objects may include information relating to price, quantity, physical characteristics of the item, delivery time, etc. In other examples, the data objects may relate to other information that may be relevant to other types of applications. Each data object in the central system 20 includes a version identifier. The version identifier may be, for example, a version number that is incremented after each change or modification. Alternatively, the version identifier may be a timestamp that reflects the actual time of the modification. Yet in other implementations, a different non-cyclical identifier may be used to track the changes made to the central data objects.

The information relating to the data objects, such as price or quantity, may be modified or changed through the user interface 24. These changes may be made by a system administrator accessing the central system 20 or, alternatively, by application systems in the network that are authorized to make these modifications. When a data object is modified in the central database 22, the central system 20 sends a message to the systems in the network to update their respective local copies of the central data objects. These messages are sent asynchronously to the other systems in the network through message transport layer 26. In this example, a network 12 connects the central system 20, the sales system 30, and logistics system 40. The network 12 may be a LAN, the Internet, or another suitable network.

The sales system 30 includes a local cache database 32, a system database 34, a business application 36, and a message transport layer 38. The local cache database 32 stores the sales system's local copy of the central data objects that are maintained by the central system 20. Each data object stored in the local cache database 32 includes the version identifier assigned by the central system 20. The system database 34 stores data that is maintained and modified exclusively by the sales system 30. This may include customer names and addresses, payment information, etc. In other implementations, the sales system 30 may include additional databases. These databases could store replicated data, such as the data objects stored by the local cache database 32, or could store other information used exclusively by the sales system 30.

The business application 36 of the sales system 30 executes applications or algorithms and creates business documents as discussed previously. In the FIG. 1 example, the sales system 30 generates business documents using the data stored in the local cache database 32 and system database 34. In other examples, additional information from other databases may also be used. Once the business documents are generated and processed by the applications in the business application 36, they are sent as part of a message to the other systems in the network for further processing. The messages are sent to the other systems through the message transport layer 38 and network 12. In this example, the messages are sent to the other systems asynchronously; however, the messages may also be transmitted between the systems using other suitable methods. The transport layer 38 also receives, from the central system 20, messages that contain the changes that have been made to the central data objects. The transport layer 38 also receives messages from the other systems in the network, such as the logistics system 40.

In the FIG. 1 example, the logistics system 40 is similar to the sales system 30 in that it includes a local cache database 42, a system database 44, a business application 46, and a message transport layer 48. The local cache database 42 stores the logistics system's local copy of the central data objects that is used in conjunction with the system database 44 to execute business applications and process business documents in a manner similar to the sales system 30. Messages are sent and received by the logistics system 40 via message transport layer 48.

Figure 2:
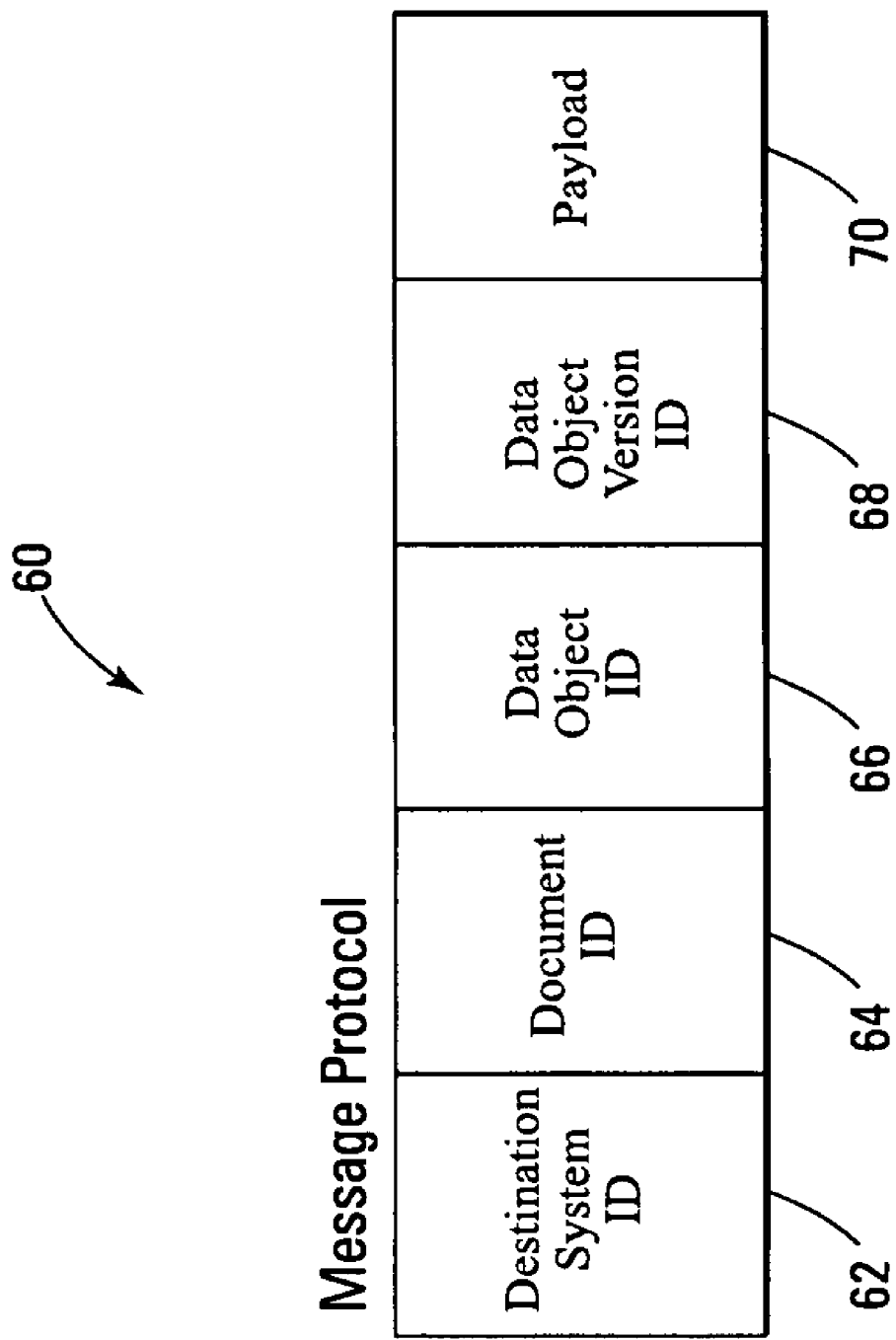
FIG. 2 is a diagram showing an example protocol for a message that may be transferred between the systems of FIG. 1.

FIG. 2 is a diagram of an example message format that may be used for messages transferred between the systems of FIG. 1. The message format may be best described in the context of the FIG. 1 example where a customer order is generated by the sales system 30 and is sent to the logistics system 40 for further processing. In the FIG. 2 example, the message 60 includes a destination system identifier 62, which identifies the system or systems to which the message is being transferred. A document identifier 64 is also included in the message. The document identifier 64 identifies the type of document being transmitted, such as a customer order, rather than a delivery order, an invoice, or some other type of document.

The message 60 also includes a data object identifier 66. The data object identifier 66 identifies the data object or data objects that were used to generate the document being transmitted. Alternatively, the data objects themselves, rather than an identifier, may be included in the message. Data object version identifiers 68 for each data object are also included. The identification of the data objects and the corresponding version identifiers allow the receiving system to determine whether its local cache database includes the most recent version of the data objects, as is discussed in greater detail below. The message also includes a payload 70. The payload 70 may include values and information corresponding to the transmitted document, the data objects, or any relevant information stored in the system's own database, such as the sales system database 34. In the customer order example, the payload may include information such as the customer's name and address, the item or items that have been purchased, delivery instructions, etc. In other examples, the payload 70 may be omitted.

Figure 3:
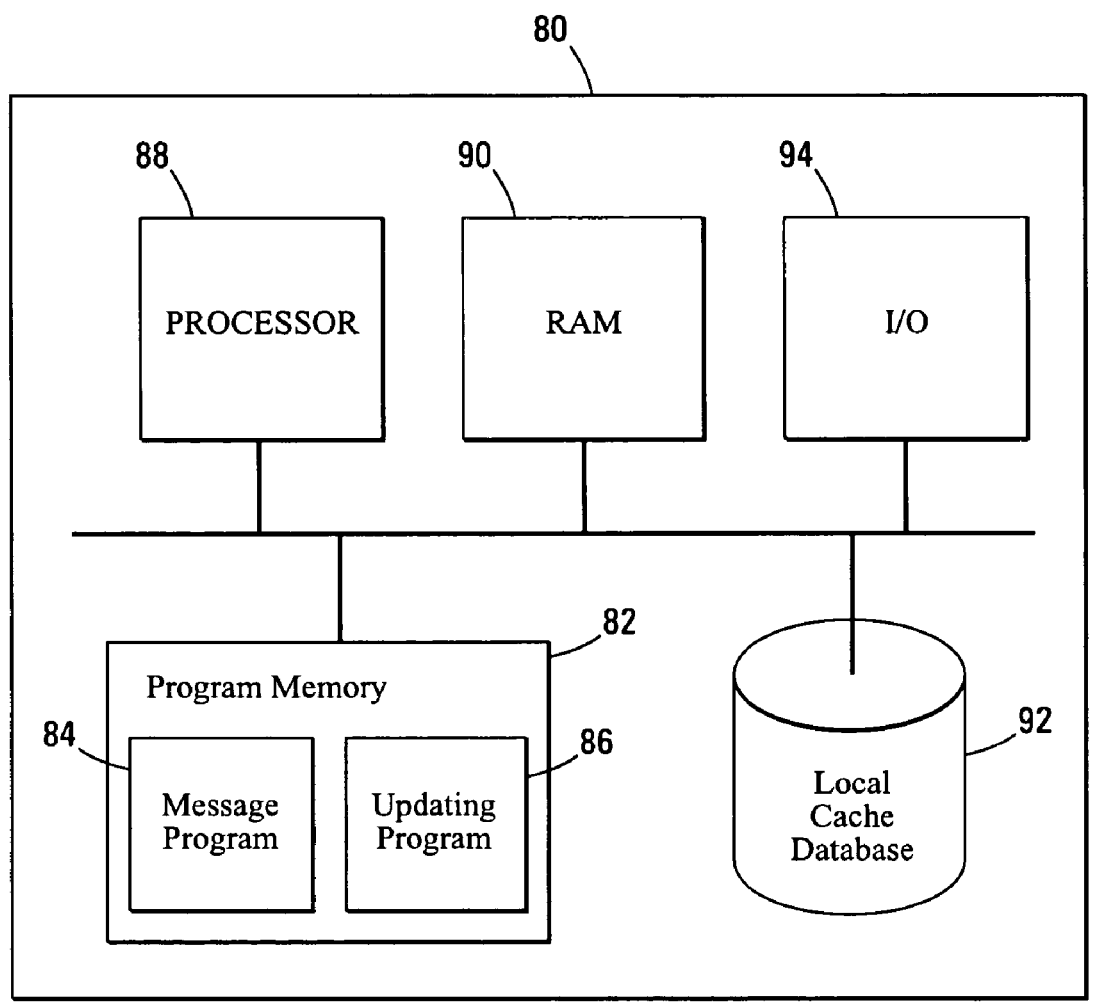
FIG. 3 is a block diagram of a computer system that may be included in the systems of FIG. 1.

FIG. 3 is a block diagram of a computer system 80 that may be included in the systems 20, 30, and 40 of FIG. 1. The computer system 80 of the FIG. 3 example includes program memory 82 containing a message program 84 and an updating program 86. The message program 84 contains instructions that when loaded into RAM 90 and executed by processor 88 generate a message for transmission to another system in the network (the message being shown in FIG. 2). The processor 88 may obtain the data objects and version identifiers included in the FIG. 2 message from local cache database 92. The message may then be stored in RAM 90 until it is output by an Input/Output module 94 to a message transport layer (shown in FIG. 1). Messages may also be received through the Input/Output module 94 and stored in RAM 90 for processing. The updating program 86 contains instructions that when loaded into RAM 90 and executed by processor 88 processes the received messages stored in RAM 90 and, if necessary, updates the data objects stored in local cache database 92.

Figure 4:
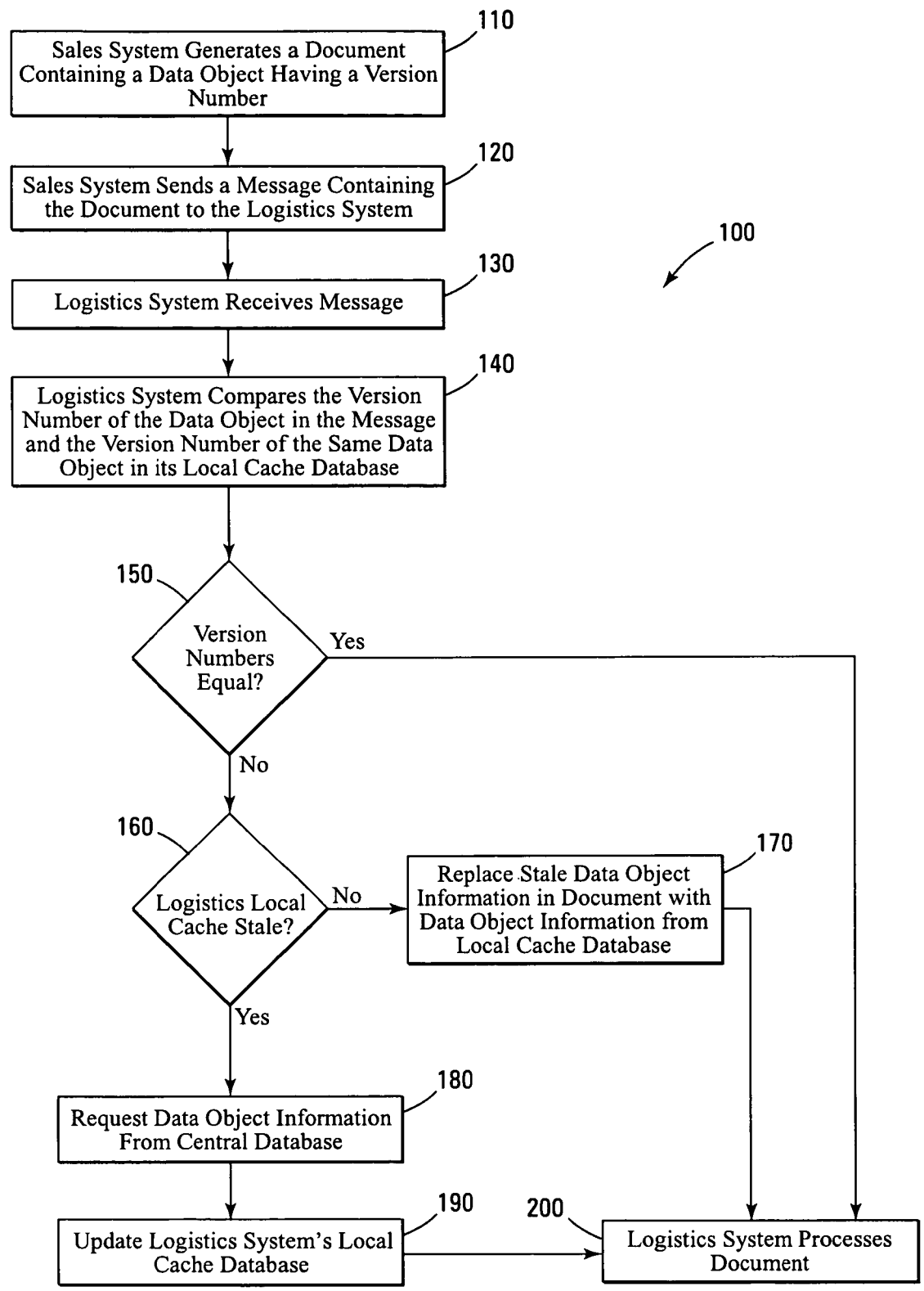
FIG. 4 is a flowchart of a method of updating a local cache database of a system shown in FIG. 1.

FIG. 4 is a flowchart depicting a method of updating a system's local cache database before processing a business document. The FIG. 4 example illustrates the method 100 using the customer order example of FIG. 1. The method 100 begins at step 110 with the generation of a document (i.e., customer order) by the sales system 30 containing information relating to a data object, as described previously. Next, the sales system 30 sends a message to the logistics system 40 at step 120. The message contains a document identifier, a data object identifier, and a version identifier, for example, a version number of the data object used by the sales system to generate the document, as shown in FIG. 2. In examples where more than one data object is used by the sales system 30 to generate the document, the message contains the additional data objects and corresponding version numbers. At step 130, the logistics system 140 receives the message from the sales system containing the document and related data object information.

Upon receipt of the message containing the document at step 140, the logistics system 40 compares the version numbers of the data objects identified in the message with the version numbers of the corresponding data objects stored in the logistic system's local cache database 42. If it is determined at step 150 that the versions of the data objects are equal or the same, then the logistics system 40 proceeds by processing the document at step 200. If, on the other hand, the version numbers are not the same, then the logistics system 40 must determine at step 160 if the local copy of the data object stored in its local cache database 42 is stale or if the sales system 30 used a stale version of the data object to generate the document. The logistics system 40 can make this determination by comparing the version numbers of the data objects.

If the version of the data objects in the logistics system's local cache is more recent than the version of the data objects set forth in the message, then a process may be performed at step 170 to replace the information generated by the sales system 30 using the stale data object information with updated data object information. This process may be performed by sending a message to the sales system 30 indicating that a more recent version of the data objects exist and having the sales system 30 update its local cache 32 and regenerate the document. Alternatively, the logistics system 40 could update the information in the document and send a message to the sales system 30 indicating that an update of the data objects in the sale system's local cache database 32 is necessary. Once the stale data object information in the document has been replaced and the potential conflicts have been resolved, the logistics system 40 can process the document at step 200.

Alternatively, if the logistics system 40 determines at step 160 that the version of the data objects in its local cache database 42 are stale, then the logistics system 40 requests a more recent version of the data objects from the central database 22 at step 180. Once the logistics system 40 has received the most recent version of the data objects at step 190, it may proceed by processing the document at step 200.

A number of embodiments of the invention have been described. Nevertheless, it will be understood that various modifications may be made without departing from the spirit and scope of the invention. For example, the method of updating the local cache database of a system is applicable to networks with more than two application systems. The method may also be used in networks that have conflicts between the local cache databases of the various systems, but do not employ asynchronous messaging. Accordingly, other embodiments are within the scope of the following claims.

What is claimed is:

1. A method of updating a local cache of an application system in a multiple-system environment having a central system that maintains central data objects that are shared by the multiple systems, the method comprising:
    receiving a message from a first application system, the message identifying a data object having a version identifier assigned by the central system;
    comparing the version identifier of the data object in the message to a version identifier of a corresponding data object stored in the local cache of a second application system;
    requesting, from the central system, a more recent copy of the data object in the central system if the version identifier of the data object stored in the local cache of the second application system indicates that a more recent version of the data object exists; and
    updating the local cache of the second application system with the more recent copy of the data object in the central system.

2. The method of claim 1 wherein the version identifier is a timestamp that indicates the time of the modification of the data object.

3. The method of claim 1 wherein the version identifier is a version number that is incremented after each modification of the data object.

4. The method of claim 1 wherein the message from the first application system contains the data object having a version identifier assigned by the central system.

5. The method of claim 1 wherein the message from the first application system identifies a document that was processed using the data object.

6. The method of claim 1 wherein the updating of the local cache database of the second application system with a most recent copy of the data objects is performed by receiving an asynchronous message from the central system containing a most recent copy of the data objects.

7. The method of claim 1 wherein the central data objects are shared by the multiple systems by storing a copy of the central data objects in a local cache of each system.

8. The method of claim 7 wherein the central system updates the local cache of each system by sending an asynchronous message to each system containing the most recent copy of the central data objects.

9. A method of updating a local cache of an application system in a multiple-system environment having a central system that maintains central data objects that arc shared by the multiple systems, the method comprising:

executing an application in a first application system and processing a document using a data object having a version identifier assigned by the central system;

sending a message to a second application system containing a data object identifier to identify the data object used to process the document and the version identifier that corresponds to the data object;

receiving the message at the second application system and comparing the version identifier of the data object in the message to a version identifier of a corresponding data object stored in the local cache of the second application system;

requesting, from the central system, a more recent copy of the data object in the central system if the version identifier of the data object stored in the local cache of the second application system indicates that a more recent version of the data object exists; and updating the local cache of the second application system with the more recent copy of the data object in the central system.

10. The method of claim 9 wherein the version identifier is a timestamp that indicates the time of the modification of the data object.

11. The method of claim 9 wherein the version identifier is a version number that is incremented after each modification of the data object.

12. The method of claim 9 wherein the message identifies the document that was processed using the data object.

13. A computer readable medium having embedded thereon executable instructions that when executed cause a processor of an application system in a multiple-system environment having a central system that maintains central data objects that are shared by the multiple systems to:

in response to receiving a message from a system, the message identifying data objects having version identifiers assigned by the central system, compare the version identifiers of the data objects in the message to version identifiers of corresponding data objects stored in the local cache of the application system;

request, from the central system, a most recent copy of the data objects in the central system if the version identifiers of the data objects stored in the local cache of the application system indicate that a more recent version of the data objects exist; and update the local cache of the application system with the most recent copy of the data objects in the central system.

14. The method of claim 13 wherein the version identifier is a timestamp that indicates the time of the modification of the data object.

15. The method of claim 13 wherein the version identifier is a version number that is incremented after each modification of the data object.

16. The method of claim 13 wherein the message contains the data object having a version identifier assigned by the central system.

17. The method of claim 13 wherein the message identifies a document that was processed using the data object.

18. The method of claim 13 wherein the update of the local cache of the application system with a most recent copy of the data objects is performed by receiving an asynchronous message from the central system containing a most recent copy of the data objects.

19. The method of claim 13 wherein the central data objects are shared by the multiple systems by storing a copy of the central data objects in a local cache of each system.

20. The method of claim 19 wherein the central system updates the local cache of each system by sending an asynchronous message to each system containing the most recent copy of the central data objects.

* * * * *